United States Patent
Stahlecker

[11] Patent Number: 5,722,227
[45] Date of Patent: Mar. 3, 1998

[54] OPEN-END SPINNING ROTOR

[75] Inventor: Fritz Stahlecker, Josef-Neidhart-Strasse 18, 73337 Bad Überkingen, Germany

[73] Assignees: Fritz Stahlecker, Bad Uberkingen; Hans Stahlecker, Süssen, both of Germany

[21] Appl. No.: 724,671

[22] Filed: Oct. 1, 1996

[30] Foreign Application Priority Data

Dec. 8, 1995 [DE] Germany ............... 195 45 386.2

[51] Int. Cl.[6] ............................................. D01H 4/12
[52] U.S. Cl. ........................ 57/406; 384/610; 384/245
[58] Field of Search ...................... 57/400, 404, 406; 384/610, 245

[56] References Cited

U.S. PATENT DOCUMENTS

| | | | |
|---|---|---|---|
| 4,105,265 | 8/1978 | Stahlecker | 57/406 X |
| 4,186,548 | 2/1980 | Stahlecker | 57/406 |
| 4,265,498 | 5/1981 | Luce et al. | 384/610 X |
| 4,618,273 | 10/1986 | Gotz et al. | 384/610 X |
| 4,805,432 | 2/1989 | Paulhac | 384/610 X |
| 4,856,918 | 8/1989 | Inoue et al. | 384/610 |
| 4,916,891 | 4/1990 | Landwehrkamp et al. | 57/406 |
| 5,222,353 | 6/1993 | Stahlecker | 57/406 |
| 5,261,221 | 11/1993 | Stahlecker et al. | 57/406 |
| 5,349,809 | 9/1994 | Stahlecker | 57/406 |
| 5,487,612 | 1/1996 | Anderson | 384/610 X |

FOREIGN PATENT DOCUMENTS

| | | | |
|---|---|---|---|
| 417856 | 9/1925 | Germany | 384/245 |
| 506372 | 9/1930 | Germany | 384/245 |

*Primary Examiner*—Daniel P. Stodola
*Assistant Examiner*—Tina R. Taylor
*Attorney, Agent, or Firm*—Evenson McKeown Edwards & Lenahan, PLLC

[57] ABSTRACT

In the case of a shaft for an open-end spinning rotor, a supporting element arranged at a step bearing extends the shaft. The supporting element is arranged centrical to the axis of the shaft. The supporting element is affixed to the shaft by means of a separate holding part, which engages with the circumferential surface of the shaft to enable in a simple way, an exact axial and radial positioning of the supporting element on the shaft.

20 Claims, 2 Drawing Sheets

OPEN-END SPINNING ROTOR

BACKGROUND AND SUMMARY OF THE INVENTION

The present invention relates to an open-end spinning rotor comprising a rotor cup and a shaft whose free end is provided with a supporting element positioned at a step bearing, which supporting element extends the shaft.

The open-end spinning rotor is a wearing part which is exchanged after a long operational life. Before the wear of the rotor cup, signs of wear begin to show on the end of the open-end spinning rotor which faces the step bearing. In the case of longer operating durability, combined with extremely high speeds of the open-end spinning rotor, the supporting element, which is supported on the step bearing, becomes shortened axially. The shortening of the supporting element results in the rotor cup altering its position in the spinning arrangement to an inadmissible degree. It would normally be possible to compensate for the change in position caused by the shortened length of the open-end spinning rotor by means of an axial readjustment of the step bearing. This is, however, impractical in the case of spinning machines comprising a large number of spinning stations, as the open-end spinning rotors should be interchangeable.

It is known (German published patent application 40 37 833) to install a small plate as a supporting element in an open-end spinning rotor. The small plate, which can be exchanged in the case of wear, is affixed to the radial end surface of the shaft. Many different types of attachment are disclosed. The small plate can be adhered, soldered or vulcanized to the radial end surface of the shaft. If a counterbalancing is necessary after the small plate has been applied to the shaft, the peripheral surface of the small plate can be subsequently ground.

It is known (German published patent application 40 20 411) to fit a cap-type supporting element to the free end of the shaft. The cap-type supporting element is placed on the end section of the shaft and is disposed with a hollow cylindrical area on the peripheral surface of the shaft in a form fit. Due to the secure centering between the supporting element and the rotor shaft, no inadmissible unbalanced mass occurs after a supporting element has been exchanged.

It is an object of the invention to provide an open-end spinning rotor with a supporting element which can be fitted in a simple way and in an exact radial and axial position on the shaft of the open-end spinning rotor.

This object has been achieved in accordance with the present invention in that the supporting element is affixed to the shaft by means of a separate holding part which acts on the peripheral surface of the shaft.

By using a separate holding part it is possible to apply the supporting element in a simple way to the shaft. The supporting element itself has no fastening function, which is why forms and materials can be used in its construction which serve purely for the purpose of supporting.

The shaft does not need to be altered in order to affix the supporting element. In particular, it is not necessary to machine the rear end of the shaft in any way, for example by applying a bore hole or other holding means. The holding part can be made in such a way that it may be affixed in a simple way to the peripheral surface of the shaft, for example by sliding it onto the end section of same.

The position of the supporting element is set by the holding part. It can thus be applied to the shaft without the use of adjusting tools. The position of the holding part, which acts on the peripheral surface of the shaft, is always constant.

The supporting element is disposed against the radial end surface of the shaft and is supported radially and axially against the holding part. An exact position of the supporting element is thus maintained in a simple way.

In an advantageous embodiment the holding part can be released from the peripheral surface of the shaft. It is possible hereby to remove the holding part and the supporting element easily, for example for the purpose of exchanging them. Practically, the holding part can be pressed onto the end section of the shaft.

It is advantageous to make the holding part as re-usable component and the supporting element as an exchangeable one. The holding part can be released from the shaft without any damage being caused to it and then re-applied with a new supporting element, which can be made of resistant material or of wear material.

The supporting element is held in an advantageous way radially and axially exact by holding surfaces of the holding part, whereby before being applied to the shaft, the supporting element is freely movable inside of the holding part. In an advantageous way, a hollow cylindrical interior surface of the holding part can be used as a holding surface for holding the supporting element radially.

As the supporting element has no holding function, it can have various forms. In an advantageous way, a cylindrical disc can be used as a supporting element, which, for example, can he made of ceramic material.

In another advantageous embodiment of the present invention, a ball can be used as a supporting element. This can be made simply. It is also advantageously possible to use a ball section as a supporting element.

These and further objects, features and advantages of the present invention will become more readily apparent from the following detailed description thereof when taken in conjunction with the accompanying drawings.

DETAILED DESCRIPTION OF THE DRAWINGS

Figure 1:
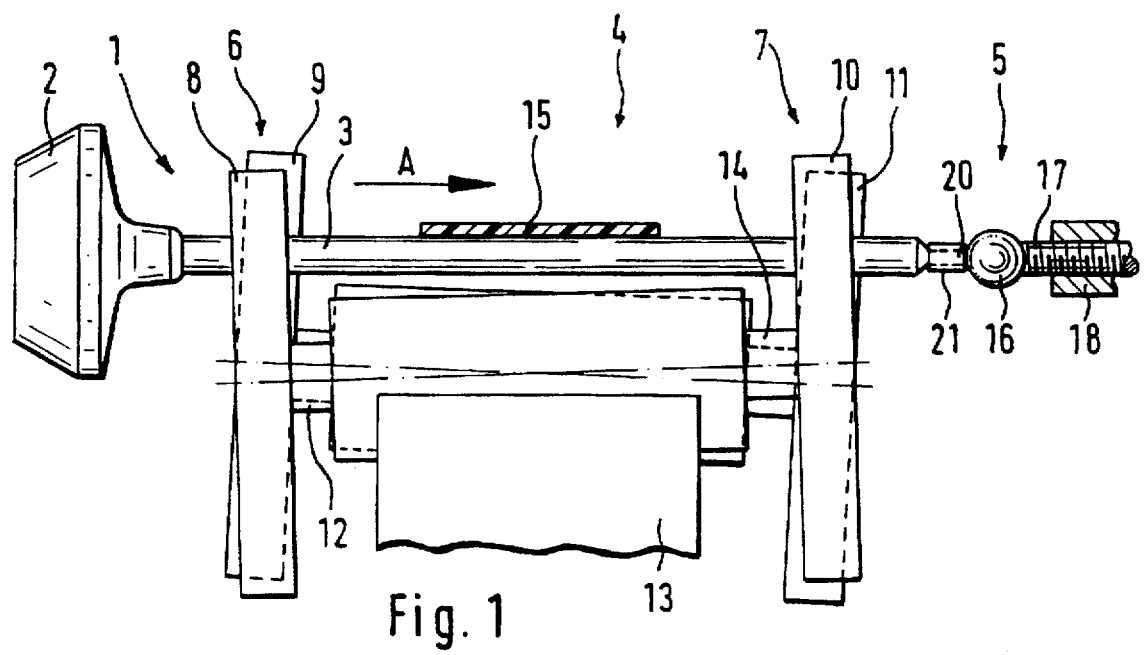
FIG. 1 is a side view of an open-end spinning rotor whose shaft is supported in a radial bearing and in a step bearing, constructed according to a preferred embodiment of the invention.

The open-end spinning rotor 1 shown in FIG. 1 is a component of an open-end spinning arrangement (not shown). It comprises a rotor cup 2 and a shaft 3, which is supported in a radial bearing 4 and a step bearing 5.

The radial bearing 4 comprises two supporting disc pairs 6 and 7 each with two supporting discs 8,9 and 10,11 respectively. The shaft 3 is radially supported in wedge-shaped gaps (not shown) formed by the supporting disc pairs 6 and 7. The supporting discs 8,10 are arranged on an axle 12 which is supported in bearings, which bearings are supported in a bearing holder 13. In a corresponding way, the adjacent supporting discs 9,11 are supported on an axle 14, which is supported in bearings, which bearings are held with a bearing holder 13.

The shaft 3, supported in the wedge-shaped gaps of the supporting disc pairs 6 and 7, is driven by a tangential belt 15. The axle 12 of the supporting discs 8,10 and the axle 14 of the adjacent supporting discs 9,11 are arranged obliquely to one another in such a way that the rotating shaft 3 is loaded with an axial force in the direction of arrow A. By means of this axial force, the shaft 3 is supported against a supporting ball 16 of the step bearing 5.

The supporting ball 16 is supported, freely rotatable, in a ball cup-shaped receiver of an adjusting screw 17, which is arranged adjustably in a housing part 18. Because of machine vibrations, the supporting ball 16 is caused to carry out vibrations of low amplitudes and high frequency, whereby, due to varying supporting points, the supporting ball 16 rotates around a plurality of axes. The supporting ball 16 is continuously wetted by a lubricant (not shown).

The free end of the shaft 3 is provided with a supporting element 20, which is held on the shaft 3 by a holding part 21.

Figure 2:
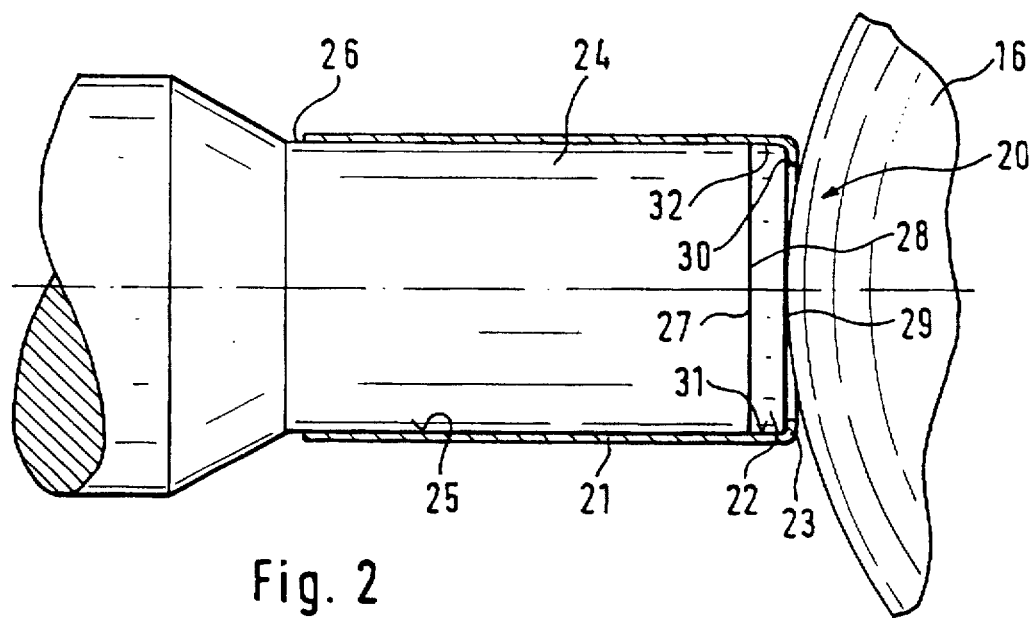
FIG. 2 is an enlarged, sectioned cut view from FIG. 1 of that end of the shaft which faces the step bearing, with a first embodiment of a supporting element.

In the first embodiment shown in FIG. 2, the supporting element 20 is formed as a cylindrical disc 22, which is made from a ceramic material, preferably from silicon nitride.

The holding part 21 has the form of a tube, which, at one front end, ends with an inwardly projecting, ring-shaped extending web 23. The tube-shaped holding part 21, which can for example be made of sheet metal, is pressed onto an end section 24 of the shaft 3. It is hereby disposed with a hollow cylindrical inner surface 25 form-fit against the peripheral surface 26 of the end section 24 of the shaft 3. The holding part 21 is hereby in an exact position, which is maintained even after an exchange.

The cylindrical disc 22 is disposed with a front surface 27 against a radial end surface 28 of the shaft 3. With the other end surface 29, the disc 22 is disposed on an essentially radially extending holding surface 30 of the web 23. The axial position of the disc 22 is hereby set exactly. The end surface 29 of the disc 22 serves as a supporting surface of the shaft 3, which is pressed against the supporting ball 16 of the step bearing 5 (see also FIG. 1) during operation.

The disc 22 is disposed with its peripheral surface 31 against a holding surface 32, which is formed by the hollow cylindrical inner surface 25 of the holding part 21. The radial position of the disc 22 is thus set exactly by the inner surface 25 of the holding part 21.

The holding part 21 and the disc 22 can be applied to the end section 24 of the shaft 3 in a simple way. The disc 22 is freely movable inside the holding part 21 before being pressed on, so that displaced air can escape during pressing on. The holding part 21 can be removed without difficulty from the end section 24 of the shaft 3 by means of a suitable tool. This may be necessary when the supporting element 20, in the form of an exchangeable part, is worn out and has to be replaced by a new one. The holding part 21 can be constructed as a re-usable component and made sufficiently stable. The holding part 21 could be made as a turned part (made by turning on a lathe) instead of as a sheet metal part in order to achieve greater stability.

Figure 3:
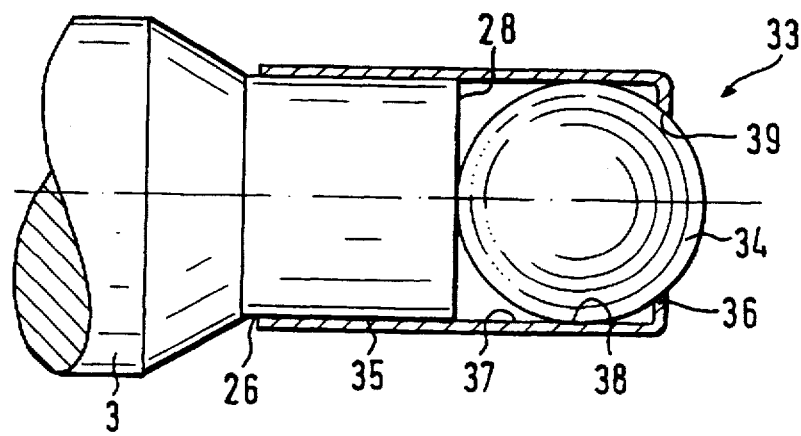
FIG. 3 is an enlarged, sectioned cut view from FIG. 1 of that end of the shaft which faces the step bearing, with a second embodiment of a supporting element.

In the second embodiment shown in FIG. 3, a ball 34 is provided as a supporting element 33, which ball 34 is preferably made of steel. The ball 34 is supported in a tubeshaped holding part 35, which ends at one end with an inwardly projecting, ring-shaped web 36. The ball 34 is fixed in radial direction of the shaft 3 by means of a holding surface 38 disposed on the hollow cylindrical inner surface 37 of the holding part 35. The ball 34 is disposed in axial direction against the radial end surface 28 of the shaft 3 and against a holding surface 39 formed at the web 36 of the holding part 35. This holding surface 39 serves at the same time to hold the ball 34 in radial direction.

Figure 4:
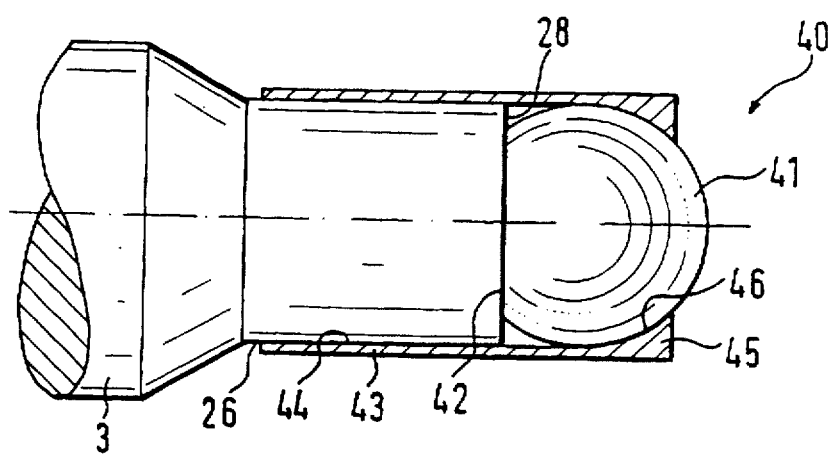
FIG. 4 is an enlarged, sectioned cut view from FIG. 1 of that end of the shaft which faces the step bearing, with a third embodiment of a supporting element.

In the third embodiment shown in FIG. 4, the supporting element 40 is in the shape of a ball section 41. The plane surface 42 formed by the ball section 41 is disposed against the radial end surface 28 of the shaft 3. The ball section 41 is supported in an essentially tube-shaped holding part 43, whose hollow cylindrical inner surface 44 is disposed with a press-fit against the peripheral surface 26 of the shaft 3. The holding part 43, in the form of a turned part, comprises a radial, inwardly projecting section 45 in the area of the front end which supports the ball section 41. The holding part 43 is adapted to the form of the ball section 41 in the area of the section 45 and is thus concavely curved on the inner side. In this way, a holding surface 46 is formed on the holding part 43, which serves to hold the supporting element 40 axially as well as radially.

Figure 5:
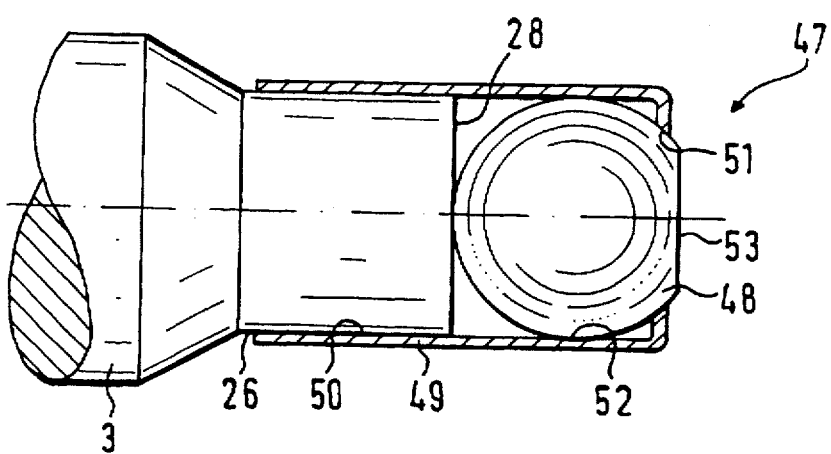
FIG. 5 is an enlarged, sectioned cut view from FIG. 1 of that end of the shaft which faces the step bearing, with a fourth embodiment of a supporting element.

In the fourth embodiment as shown in FIG. 5, the supporting element 47 takes the form of a ball section 48. The ball section 48 is supported in a tube-shaped holding part 49, which has the same form as the holding part 35 of FIG. 3.

The hollow cylindrical inner surface 50 of the holding part 49 is disposed with a press-fit against the peripheral surface 26 of the shaft 3. In a corresponding way to the embodiment shown in FIG. 3, the holding part 49 comprises a holding surface 51 for axial holding, and a holding surface 52 for radial holding of the supporting element 47. The holding surface 52 is disposed on the hollow cylindrical inner surface 50 of the holding part 49. The holding surface 51 serves also to hold the ball section 48 in radial direction.

The plane surface 53 formed by the ball section 48 extends parallel to the radial end surface 28 of the shaft 3. In contrast to the embodiment shown in FIG. 4, the plane surface 53 of the ball section 48 faces away from the radial end surface 28 of the shaft 3, thus forming a radially extending supporting surface of the shaft 3, which supporting surface is intended for disposition on the supporting ball 16 (see also FIG. 1) of the step bearing 5.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. In an open-end spinning rotor assembly including a rotor cup, a rotor shaft fixed to the rotor cup at one end and having an oppositely facing free end, and a step bearing having a step bearing member, the improvement comprising:
a supporting element which in use is interposed between the free end of the rotor shaft and the step bearing member, and
a holding part engaging a circumferential surface of the rotor shaft and holding the supporting element axially against the free end of the rotor shaft outside of and separate from the step bearing and step bearing member, wherein said holding part is separate from both the rotor shaft and the supporting element.

2. The improvement according to claim 1, wherein the holding part is releasably affixed to the circumferential surface of the shaft.

3. The improvement according to claim 2, wherein the holding part is affixed in a press-fit to the circumferential surface of the shaft.

4. The improvement according to claim 3, wherein the holding part is a re-usable component and the supporting element is an exchangeable part.

5. The improvement according to claim 2, wherein the holding part is a re-usable component and the supporting element is an exchangeable part.

6. The improvement according to claim 5, wherein the holding part is disposed against a the circumferential surface of the shaft with a hollow cylindrical inner surface.

7. The improvement according to claim 5, wherein the holding part has a holding surface for radial holding of the supporting element and a holding surface for axial holding of the supporting element.

8. The improvement according to claim 1, wherein the holding part is disposed against the circumferential surface of the shaft with a hollow cylindrical inner surface.

9. The improvement according to claim 1, wherein the holding part has a holding surface for radial holding of the supporting element and a holding surface for axial holding of the supporting element.

10. The improvement according to claim 9, wherein the holding surface for radial holding of the supporting element is formed by a hollow cylindrical inner surface of the holding part.

11. The improvement according to claim 10, wherein the supporting element is disposed with a positive fit on one of the holding surface for radial holding of the supporting element, and the holding surface for axial holding of the supporting element.

12. The improvement according to claim 9, wherein the supporting element is disposed with a positive fit on one of the holding surface for radial holding of the supporting element and the holding surface for axial holding of the supporting element.

13. The improvement according to claim 1, wherein the supporting element is a cylindrical disc.

14. The improvement according to claim 1, wherein the supporting element is a ball.

15. The improvement according to claim 1, wherein the supporting element is a ball section.

16. The improvement according to claim 1, wherein the supporting element is made from a ceramic material.

17. An open-end spinning rotor assembly comprising:

a rotor cup, a rotor shaft fixed to the rotor cup at one end and having an oppositely facing free end, a step bearing having a step bearing member, a supporting element which in use is interposed between the free end of the rotor shaft and the step bearing member, and a holding part engaging a circumferential surface of the rotor shaft arid holding the supporting element axially against the free end of the rotor shaft outside of and separate from the step bearing and step bearing member, wherein said holding part is separate from both the rotor shaft and the supporting element.

18. An open end spinning rotor assembly according to claim 17, wherein the holding part is a re-usable component and the supporting element is an exchangeable part.

19. An assembly according to claim 17, wherein the holding part has a holding surface for radial holding and a holding surface for axial holding of the supporting element of the supporting element.

20. An assembly according to claim 19, wherein the holding surface for radial holding of the supporting element is formed by a hollow cylindrical inner surface of the holding part.

* * * * *